United States Patent [19]
Dailey et al.

[11] Patent Number: 5,905,905
[45] Date of Patent: May 18, 1999

[54] SYSTEM FOR COPYING IOBS FROM FIFO INTO I/O ADAPTER, WRITING DATA COMPLETED IOB, AND INVALIDATING COMPLETED IOB IN FIFO FOR REUSE OF FIFO

[75] Inventors: Aaron J. Dailey; Kenneth J. Gibson, both of Boulder; Jack P. Kroun, Niwot; Edward S. Quicksall, Longmont, all of Colo.

[73] Assignee: Adaptec, Inc., Milpitas, Calif.

[21] Appl. No.: 08/906,765

[22] Filed: Aug. 5, 1997

[51] Int. Cl.[6] .............................. G06F 13/20; G06F 13/28
[52] U.S. Cl. .......................... 395/825; 395/842; 395/872; 711/158
[58] Field of Search ..................................... 395/825, 842, 395/872, 821; 711/158

[56] References Cited

U.S. PATENT DOCUMENTS

| | | | |
|---|---|---|---|
| 4,875,155 | 10/1989 | Iskiyan et al. ........................... | 364/200 |
| 4,901,232 | 2/1990 | Harrington et al. ..................... | 364/200 |
| 5,737,520 | 4/1998 | Gronlund et al. .................. | 395/183.15 |
| 5,752,078 | 5/1998 | Delp et al. ............................... | 395/827 |
| 5,802,343 | 9/1998 | Fandrich et al. ......................... | 711/158 |

Primary Examiner—Thomas C. Lee
Assistant Examiner—Rehana Perveen
Attorney, Agent, or Firm—Duft, Graziano & Forest, P.C.

[57] ABSTRACT

A host computer having a CPU and a FIFO memory connected to an I/O adapter for the exchange of I/O information between the host and the adapter. The host writes I/O commands and stores them in a relatively small FIFO memory of the host. The I/O commands are then copied to a relatively large I/O memory array in the I/O adapter where they are stored until the I/O command is completed. The FIFO is then free for use by other I/O commands from the host CPU. I/O completion information is returned to a completion queue in the host by the adapter. This information includes completion status and an indication of the number of I/O commands copied to the adapter from the host FIFO. This allows the CPU to invalidate and reuse all FIFO locations containing I/O commands that have been copied from the FIFO to the adapter I/O array.

21 Claims, 17 Drawing Sheets

SYSTEM FOR COPYING IOBS FROM FIFO INTO I/O ADAPTER, WRITING DATA COMPLETED IOB, AND INVALIDATING COMPLETED IOB IN FIFO FOR REUSE OF FIFO

FIELD OF THE INVENTION

This invention relates to a method and apparatus for exchanging I/O commands between a computer and an I/O adapter. More specifically, the invention relates to the exchange of I/O commands between a host processor or personal computer and an I/O adapter via an intelligent PCI-based bus system.

Problem

It is known to use I/O adapters as interfaces between the CPU of a host computer and the peripheral devices to which I/O commands generated by the CPU are to be delivered. I/O adapters are also used to provide an indication to the CPU that an outstanding I/O command has been completed. The use of I/O adapters relieves the CPU of the burden of directly controlling the I/O devices in the system of which the CPU is a part. I/O adapters issue command to I/O devices, monitor the low level operation of the I/O devices, and return information to the CPU when an I/O command has been successfully completed or, in instances of failure, return information to the CPU that an I/O command has failed and that the CPU should retransmit the I/O command. All of this relieves the CPU of the burden of controlling the low level operation of the I/O devices and frees up the CPU by making its real time capabilities free for other system functions.

In accordance with one prior art arrangement using an I/O adapter, a host CPU generates I/O commands arranged as I/O command blocks (IOBs), stores the IOB's in an IOB array portion of the system memory and then transmits the IOB's from the IOB array to an I/O adapter. The host memory contains a delivery queue which stores information regarding I/O commands waiting to be served. The host writes an index of each IOB into its delivery queue and then updates a register in the adapter memory to indicate to the adapter that a new I/O entry has been placed into the delivery queue as well as the I/O array of the host. The adapter uses a first direct memory access operation (DMA) to transfer the host delivery queue contents to the adapter's memory. The adapter uses a second direct memory access operation (DMA) to transfer an I/O command from an I/O array of host to an I/O array of the adapter.

The prior art I/O adapter also delivered an acknowledgment of a completed I/O command to the host. The I/O adapter did this by generating an interrupt and placing an index of a completed I/O command into the host IOB array as well as into a host completion queue with a pass count. The pass count is used to maintain the beginning and ending addresses of the delivery queue. No status information is returned to the completion queue of the host so that it must always read the contents of a completed IOB to determine the completion status.

The prior art arrangement is less than ideal since; 1) it fails to indicate the size of an IOB to the adapter so that the adapter must always transmit the maximum IOB size; 2) It does not decrease the time required for delivery an I/O request from the CPU to an I/O adapter; 3) It does not increase the number of I/O's that can be completed in a given amount of time; 4) It uses more than one DMA operation to serve an I/O command; and 5) It increases the amount of system time required to transfer information across a PCI bus connecting the I/O adapter and the system memory. The prior art arrangement is further less than ideal since it required the I/O array in the host memory to maintain a copy of each IOB transmitted to the adapter until such time as the host memory is advised by the I/O adapter that the IOB has been successfully completed. The requirement that an IOB be concurrently maintained in both the I/O array of the system memory and the I/O array of the adapter is inefficient and increases the amount of system memory required to perform I/O functions. This is true even though the I/O array and the system memory only use the I/O information for short periods of time. A further disadvantage of the prior art arrangement is that to complete an IOB, the adapter had to perform one PCI bus transfer to queue the completed IOB into the host completion queue and then the CPU had to perform a second PCI transfer to read the completion status in the completed IOB even though the vast majority of IOB's complete successfully. It can therefore be seen that the prior art I/O adapters do not efficiently use memory or the resources of the PCI bus, they require an excessive number of DMA operations and they fail to provide sufficient information to the host so that it can have all information the needs regarding a completed I/O without further communicating with the I/O adapter across the PCI bus.

Solution

The above and other problems are solved and an advance in the art is achieved by the I/O adapter of the present invention which overcomes the above discussed problems of prior art adapters. The present invention provides a first relatively small FIFO system memory and a larger IOB array in the adapter memory. I/O commands (hereinafter termed IOB's) are created by the CPU and stored temporarily in the host FIFO. The CPU writes index and other information regarding each IOB into a delivery queue in the adapter memory. This delivery queue information advises the adapter that an IOB is waiting in the host FIFO to be served. The adapter periodically scans its delivery queue, determines the location of the IOB waiting to be served in the host FIFO and then causes the IOB to be copied from the host FIFO to the IOB array in the adapter. An IOB in the delivery FIFO that has been copied to the IOB array can be invalidated and reused by the CPU after the IOB has been completed. IOB's in the IOB array in the adapter are served as the IOB's are transmitted from the adapter I/O array to the peripheral devices.

The adapter returns information on an interrupt basis to the host whenever the system completes an IOB. The information returned by the adapter to the host for a completed IOB includes an IOB index, a taken count indicating how many IOB's have been copied to the I/O adapter from the host FIFO since the last interrupt, a completion status indicating the successful or unsuccessful completion of the IOB, as well as a pass bit whose use is subsequently described. The taken count information causes the host to invalidate IOB's from the FIFO that have been copied to the IOB array. These are equal in number to the returned taken count. By this means, an IOB remains in the FIFO only briefly so that the FIFO capacity is greatly reduced compared to the prior art.

The present I/O adapter contains a number of advantageous and features compared to prior art arrangements. First of all, the I/O adapter has a large I/O array which permits it to support an I/O delivery system in the system memory with little impact on processing time. This reduces the amount of system memory required or makes the system memory available for other useful processing. Also, an IOB can be invalidated from the host FIFO as soon as it is transferred from the adapter I/O array and an IOB completion interrupt signal for any IOB is returned to the host.

By varying the size of an IOB and passing the size information to the delivery queue of the adapter, many IOBs can be served concurrently using a smaller IOB array. Also, an IOB can be transferred over the PCI bus to the adapter more quickly. This decreases the time required to complete the I/O and increases the availability of the PCI bus for other useful processing.

The present adapter has a status field in the completion queue of the system host. This allows the host to complete an I/O without reading any further information from the I/O adapter memory in the vast majority of cases. Previously a separate read operation was required across the PCI bus to obtain the status information. The information entered into the adapter delivery queue by the host includes size information regarding the size of each IOB. This size information reduces processing time for IOBs requiring relatively small memory space.

DESCRIPTION OF THE DRAWINGS

The above and other advantages and features of the invention may be better understood from a reading of a detailed description thereof taken in conjunction with the drawings which.

DETAILED DESCRIPTION

Figure 1:
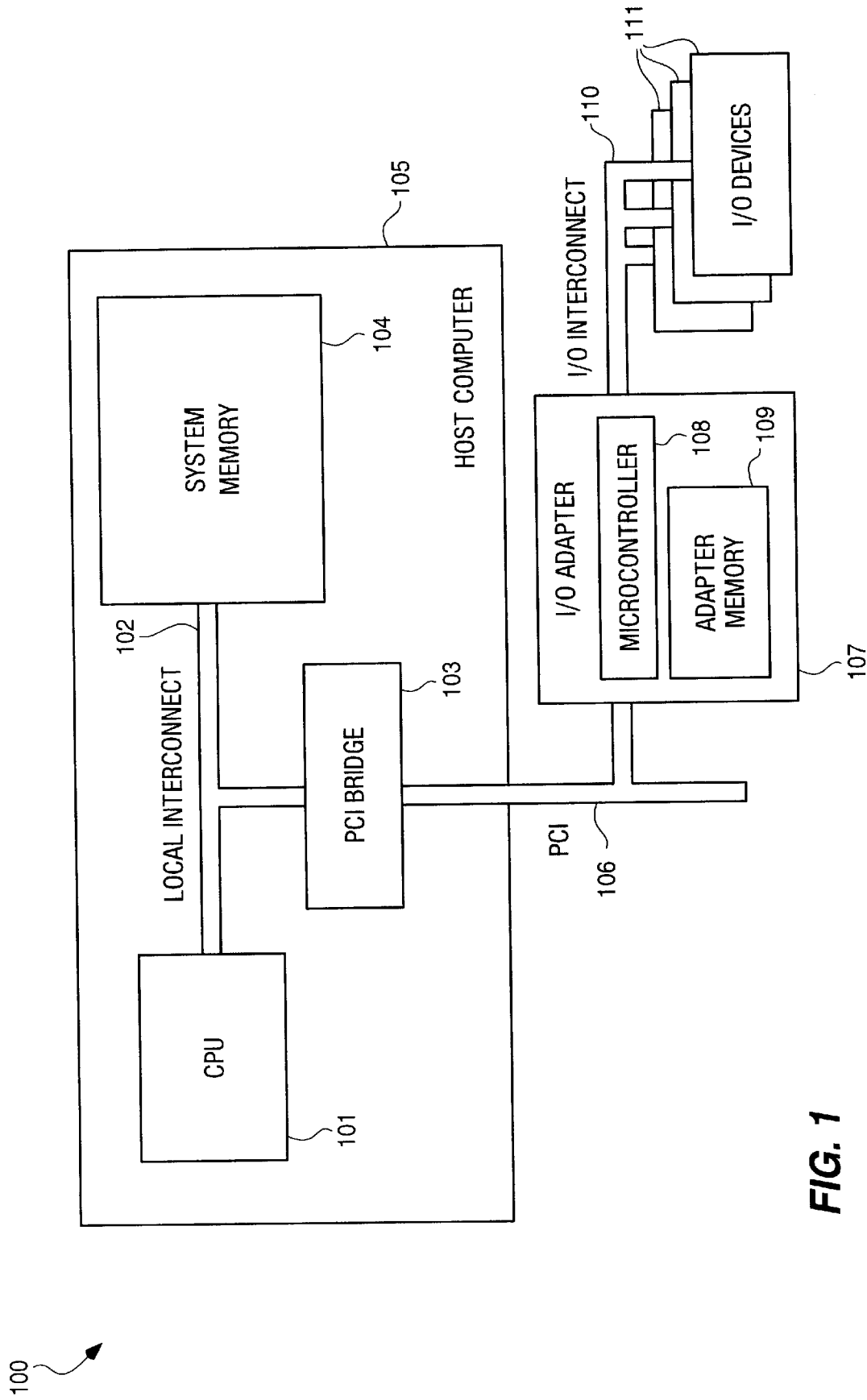
FIG. 1 discloses a system embodying the invention.

Description of FIG. 1

FIG. 1 discloses the elements of a system 100 involved in the transfer of IOB's from a host computer 105 to an I/O adapter 107 via a peripheral component (PCI) interface comprising a PCI bridge 103 and a PCI bus 106. Host computer 105 comprises a system memory 104, a CPU 101, a local bus 102 connecting CPU 101 with system memory 104 and PCI bridge 103. The lower side of the PCI bridge 103 is connected by PCI bus 106 to I/O adapter 107. I/O adapter 107 includes microcontroller 108 and adapter memory 109. IOB's received from the host computer are transmitted from I/O adapter 107 over the I/O interconnect bus 110 to the various I/O devices that require IOB's for their operation.

Memory 109 of the I/O adapter 107 is presented in both the CPU's 101 address space and the address space of micro controller 108 of the I/O adapter. To issue an IOB to adapter 107, CPU 101 builds an IOB in its system memory 104 and then writes an entry containing a reference to the IOB in a delivery queue portion of memory 109 of the adapter. This is shown in detail in subsequent figures. Microcontroller 108 of adapter 107 detects a new IOB entry in the delivery queue portion of adapter memory 109 and initiates a direct memory access operation to copy the new IOB from system memory 104 of the host computer to memory 109 of adapter 107. Upon receipt of this IOB, I/O adapter 107 executes the IOB specified by the transferred IOB. Adapter 107 delivers IOB information back to CPU 101 when the I/O function for the IOB is completed.

Figure 2:
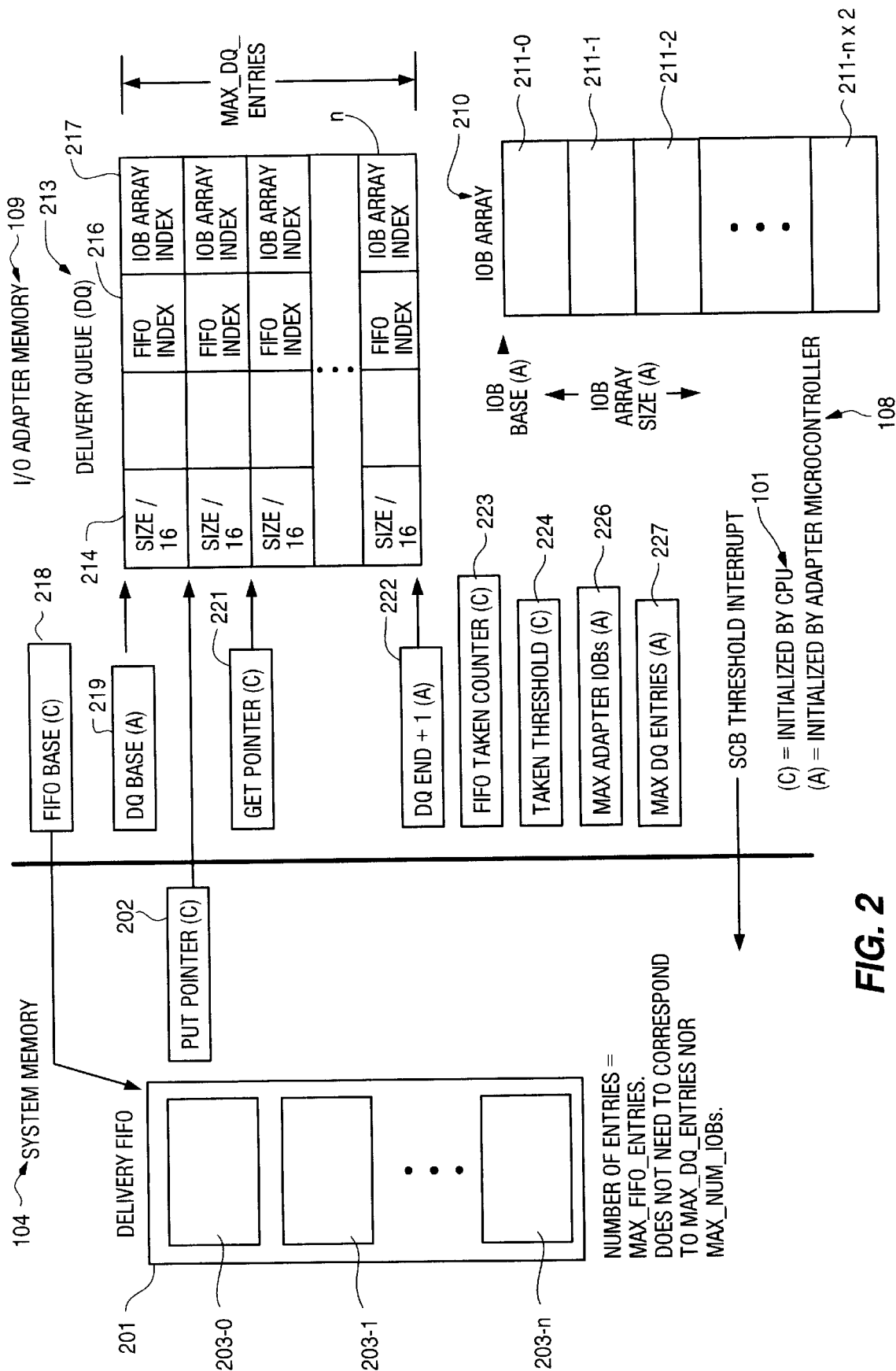
FIG. 2 discloses the elements of the system memory of a host computer and the memory of the I/O adapter used in the transfer of an IOB from the host and the I/O adapter.

Description of FIG. 2

FIG. 2 discloses the elements of system memory 104 and adapter memory 109 involved in the transfer of an IOB from host computer 105 to I/O adapter 107. The three primary data structures used in this operation are IOB array 210 in the adapter, delivery queue 213 in the adapter and delivery FIFO 201 in system memory 104. Delivery queue 213 can accommodate n different word size entries for receiving IOB's from the host. IOB array 210 stores the IOB's received from delivery FIFO 201. The size of IOB array 210 determines the number of concurrent I/O operations that adapter 107 can support. Delivery FIFO 201 in system memory 104 is used by the CPU to build IOB's for each new I/O to be delivered to adapter 107. Delivery queue 213 receives information regarding the IOB's in the delivery FIFO 201 which are queued in FIFO 201 for delivery to adapter 107.

Delivery FIFO 201 may be smaller than IOB array 210 to minimize the amount of system memory 104 required for the I/O function. IOB's remain in the delivery FIFO 201 after their delivery to IOB array 210 until the receipt of an IOB completion interrupt signal by the host. A delivery FIFO location can be reused after an IOB is copied to IOB array 210 and an IOB completion interrupt signal for any IOB is returned to the host. On FIG. 2, the delivery FIFO contains a plurality of IOB locations, 203-0, 203-1, 203-n. The I/O adapter 107 contains a DQ base register 219, and DQ end +1 register 222 and a FIFO base register 218 which points to the base address of the delivery FIFO 201. The delivery queue base register 219 points to the base address of delivery queue 213. The DQ end +1 register 222 points to the end address +1 of delivery queue 213. Adapter memory 109 also contains other register elements. Get pointer 221 points to the address of the row of the delivery queue 213 that will next be used to receive an IOB from FIFO 201. The DQ end +1 register 222 is used in a manner subsequently described to determine when the end of the delivery queue has been reached by get pointer 221, and to control the operation of get pointer 221 to return it to the initial address of the delivery queue as indicated by the DO base element 219. The taken counter 223 indicates how many IOB's the adapter has taken from delivery FIFO 201 since the last completion interrupt. The taken threshold element 224 indicates the maximum number of IOB's that can be taken by the adapter without an interrupt being returned to the host. The maximum adapter IOBs register 226 indicates the maximum number of IOB's that can be stored in IOB array 210. The maximum DQ entries register 227 indicates the maximum number of entries that can be stored in delivery queue 213. Put pointer 202 and system memory 104 are used to indicate the portion of the delivery queue 213 that will be next used by the host to enter an IOB in delivery FIFO 201 into a row of delivery queue 213 specified by put pointer 202. The FIFO base register 218 is used to store the beginning address of FIFO array 201 in system memory 104.

At initialization time, the CPU sets each entry in delivery queue 217 to a −1 to indicate that there are no valid entries in delivery queue 213. CPU 101 and adapter 107 initialize put pointer 202 and get pointer 221 to the beginning address of delivery queue 213. The CPU initializes FIFO base element 218 and the taken counter 223 to 0 and the taken threshold 224 to a predetermined value other than 0, e.g.

90% of n. The function of the taken counter 223 and the taken threshold register 224 is subsequently described in detail.

To deliver an IOB, the CPU first writes the IOB in delivery FIFO 201. It then selects an unused entry in the adapter IOB array 210 location that is to hold the IOB while the I/O is in progress. I/O adapter 107 does not do any memory management and simply downloads a received IOB into the IOB array index specified by put pointer 202 of the CPU. The host performs a single write operation using the PCI bus 106 to deliver the IOB from FIFO 201 to delivery queue 213. As shown in FIG. 2, each delivery queue entry contains a byte 216 describing an offset address in the delivery FIFO 201 that is storing the address 217 representing the address to be used in array 210 to store the IOB, and a value 214 describing the byte size divided by 16 of the IOB that is to be delivered. The byte size information is always be a multiple of the PCI cache size.

The I/O adapter 107 microcontroller 108 periodically reads a delivery queue 213 entry at its get pointer 221 address to detect the transition of the entry from a −1 to some other value. When a valid entry is detected, the I/O adapter DMA's the IOB from delivery FIFO 201 into the IOB array at an address determined using the IOB array index 217 and size 214 values in the delivery queue 213 entry. The adapter microcontroller then writes a −1 to the delivery queue location for the transferred IOB and increments get pointer 221 to the next DQ location. It proceeds in this manner and eventually wraps back to the beginning of the delivery queue.

When IOB's are DMA'ed from the host FIFO to adapter IOB array 210, the adapter increments the taken counter 223 to indicate the total number of IOB's taken by IOB array 210 since the last IOB completion interrupt. If no IOB's completes by the time the taken count 223 increments to the taken threshold 224, a threshold interrupt is sent to the host computer. The CPU maintains a count of the number of delivery FIFO 201 entries available. This count is incremented each time a FIFO entry is copied to IOB array 210. The count is incremented by the taken threshold count 224 when the CPU receives a threshold interrupt.

The following paragraphs together with drawing FIGS. 3–10 describe further details of the transfer of an IOB from the system memory 104 to I/O adapter memory 109.

Figure 3:
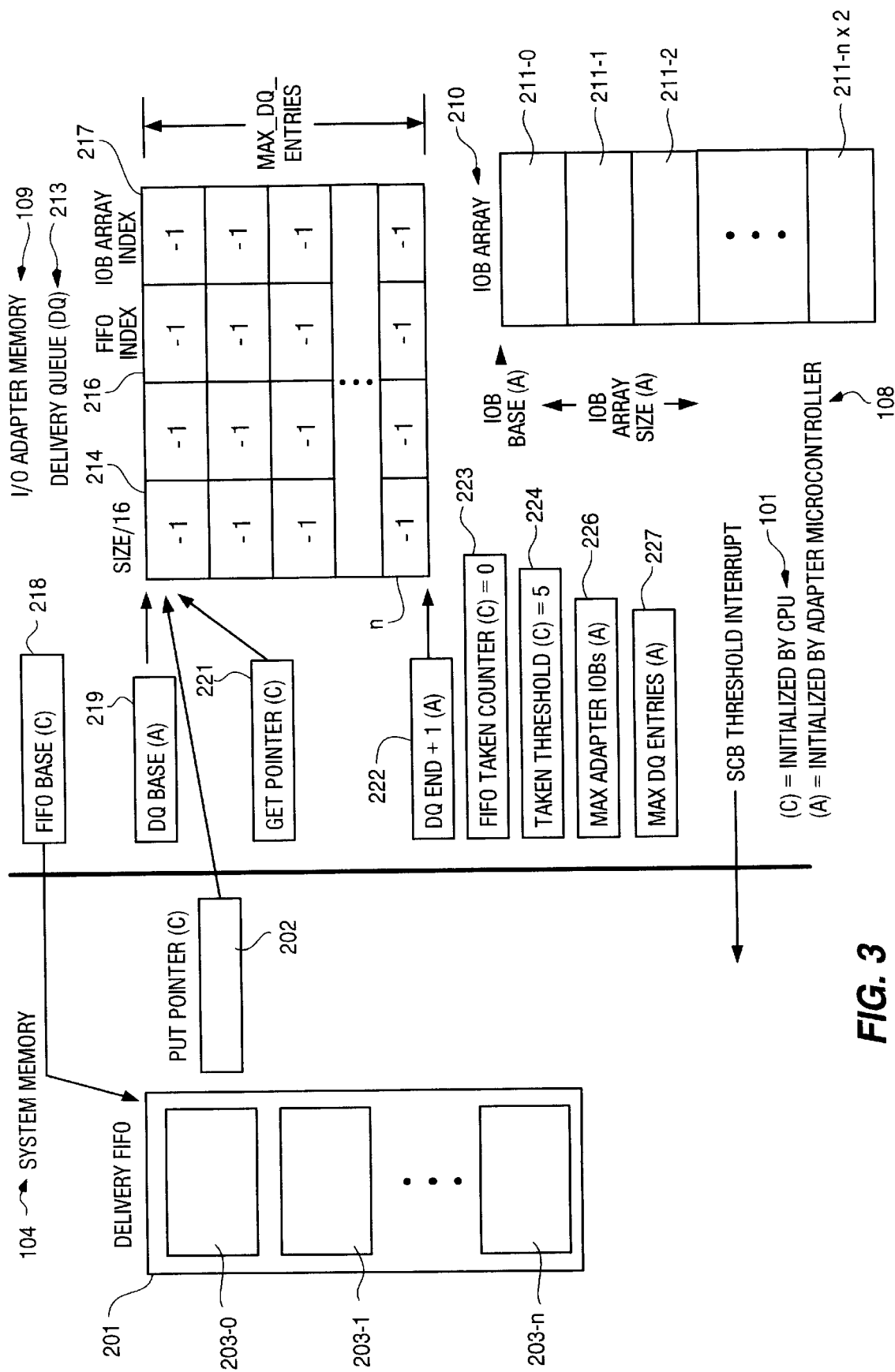
FIGS. 3–10 are similar to FIG. 2 except that they disclose the contents of the system memory and the adaptor memory in each step of the transfer of IOB's from the host to the adapter.

Description of FIG. 3

FIG. 3 illustrates the status of the system in which no IOB's are outstanding in FIFO 201. Put pointer 202 and the get pointer 221 are initialized to the base address of delivery queue 213. All entries in the delivery queue are set to a −1. The taken count 223 is initialized to 0. The taken threshold 224 is set to 5. This means that the CPU can deliver up to five IOB's to IOB array 210 before the adapter must acknowledge the receipt of the IOB's.

Figure 4:
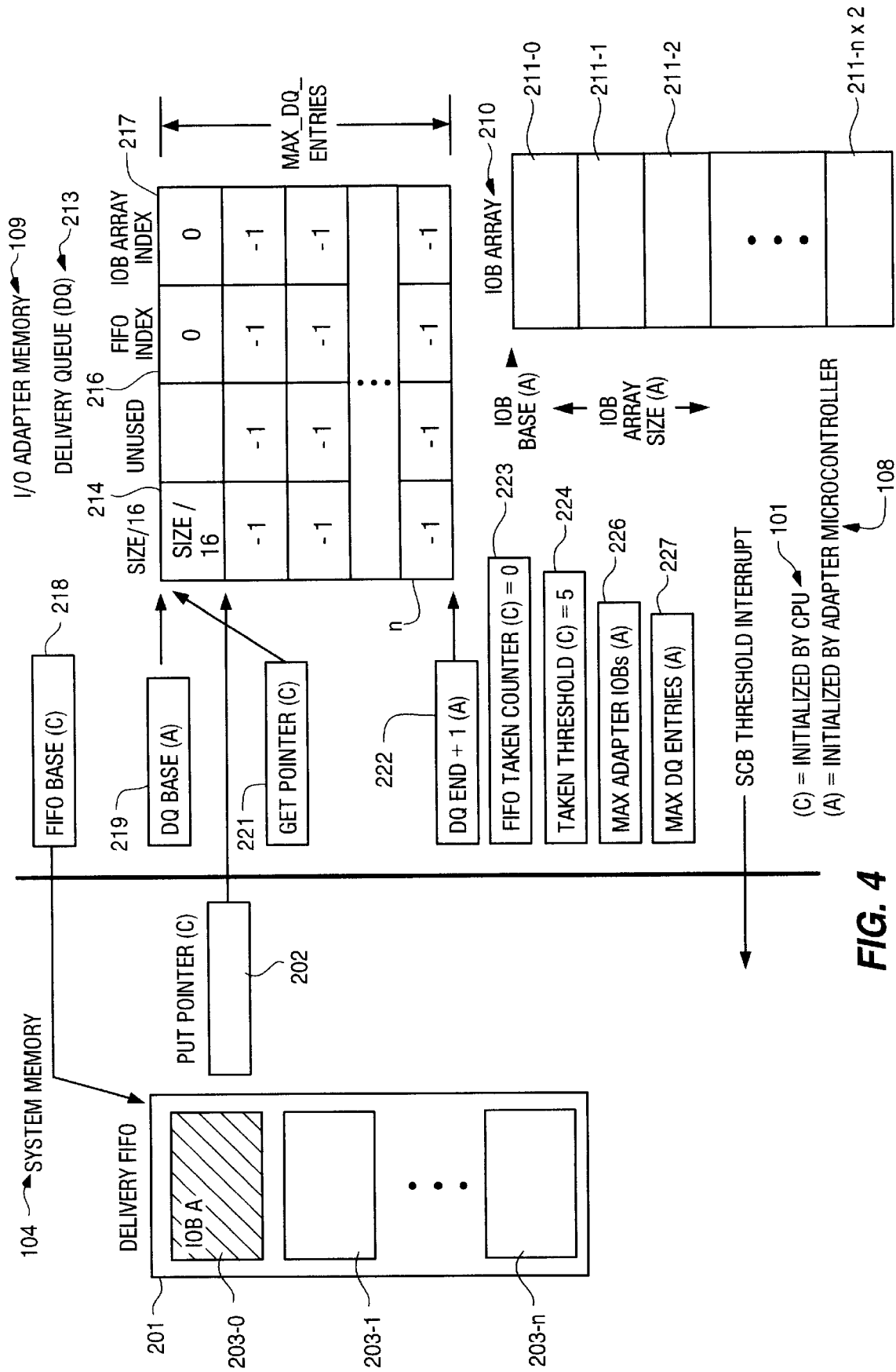

Description of FIG. 4

The CPU now creates a new IOB (IOB A) and enters it into position 203-0 of delivery FIFO 201. The CPU then selects the first location (211-0) in IOB array 210 to receive IOB A now stored in the delivery FIFO 201. The data pertaining to this IOB is entered in the first row of delivery queue 213 since put pointer 202 on FIG. 3 is set at the initial base address of the delivery queue. The CPU writes the delivery queue row referenced by the put pointer 202. Put pointer 202 is then incremented to the second row of the delivery queue and the delivery queue awaits the reception of information for the next IOB from delivery FIFO 201. Taken counter 223 remains set at 0 and the taken threshold counter 224 remains set at 5. The dashed lines for IOB A of delivery FIFO 210 indicate that IOB A is in the process of being served even though its contents are not yet copied to element 211-0 of IOB array 210.

Figure 5:
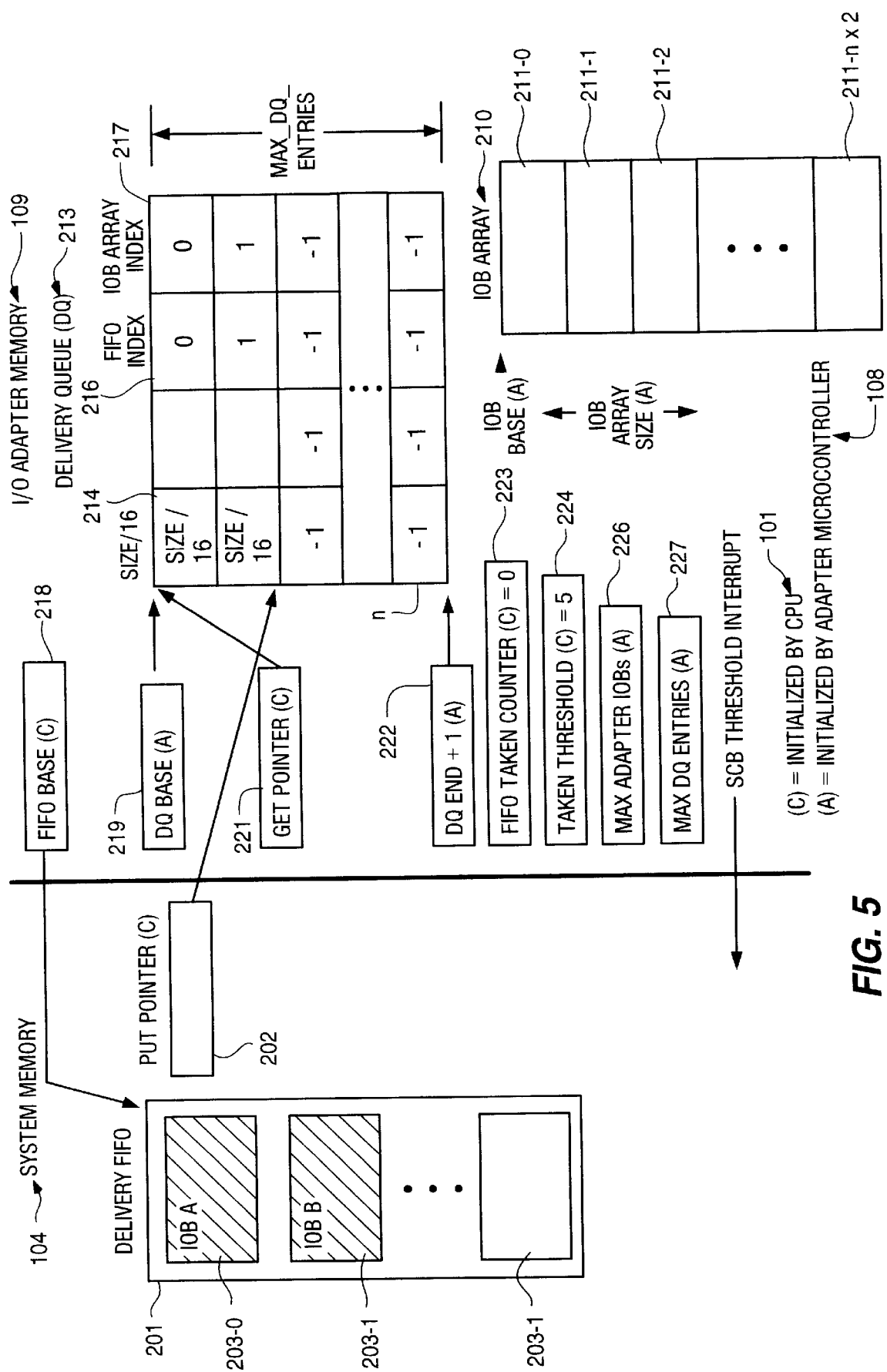

Description of FIG. 5

FIG. 5 portrays the system condition in which adapter microcontroller 108 has not recognized the IOB stored in the first row of delivery queue 213. Also, the CPU has written a second IOB, IOB B, into FIFO 201 and delivered IOB B to delivery queue 213. This is done by writing IOB B in delivery FIFO 201 as portrayed by the dashed lines and by selecting the second row of delivery queue 213 to receive IOB B. The first line of the delivery queue is currently storing the information for IOB A. The FIFO index is 0 for the first row in the delivery queue to indicate the offset address for IOB 0 in the delivery FIFO. The IOB array index is 0 in the delivery queue to indicate that the top row 211-0 of IOB array 210 will receive IOB A from the delivery FIFO.

Information for IOB B is now stored in the second row of the delivery queue. The IOB's array index is 1, the FIFO index is set to a 1 to represent the address in the delivery FIFO that is now storing the beginning of IOB B. The size divided by 16 columns in both the first and second rows contain information specifying the byte size of the IOB to be transferred to the IOB array in the adapter memory. IOB B is written into the middle row of the delivery queue under control of the put pointer 202, which at the beginning of this operation is set to the beginning address of the middle row of the delivery queue as shown in FIG. 4.

Finally, put pointer 202 is incremented to the beginning of the third row of the delivery queue awaiting the reception of information for the next IOB from the delivery FIFO. The taken counter and the threshold counter remain set at 0 and 5 respectively since IOB array 210 has not yet received either IOB A or IOB B from the delivery FIFO.

Figure 6:
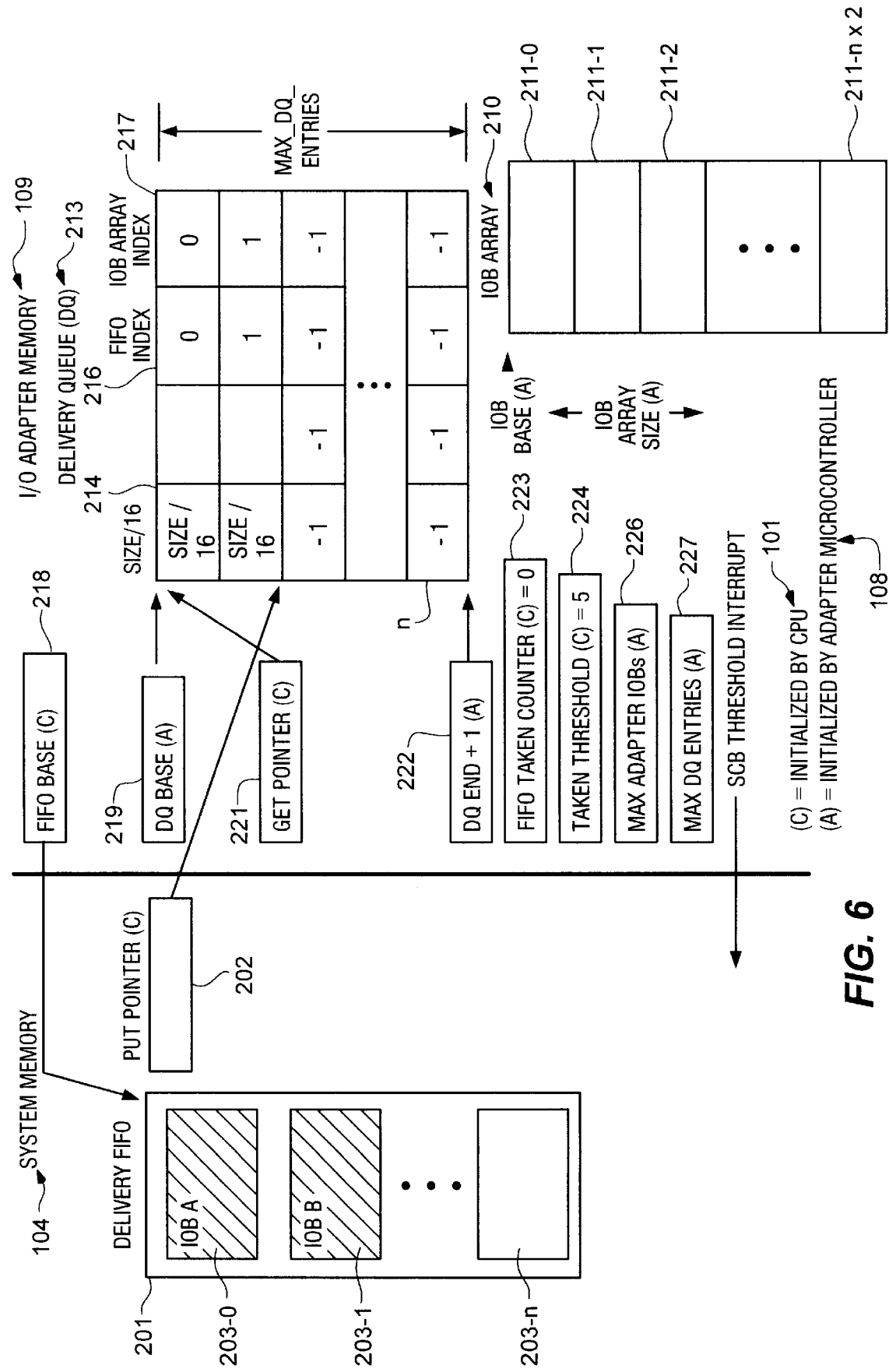

Description of FIG. 6

FIG. 6 represents the system condition in which the I/O adapter still has not copied any IOB's from delivery FIFO 201. Also, the CPU has another IOB to deliver to FIFO 210 but has not yet done so. FIFO locations 203-0 and 203-1 locations contain IOB A and IOB B which have not yet been copied to IOB array 210 in the adapter memory.

Figure 7:
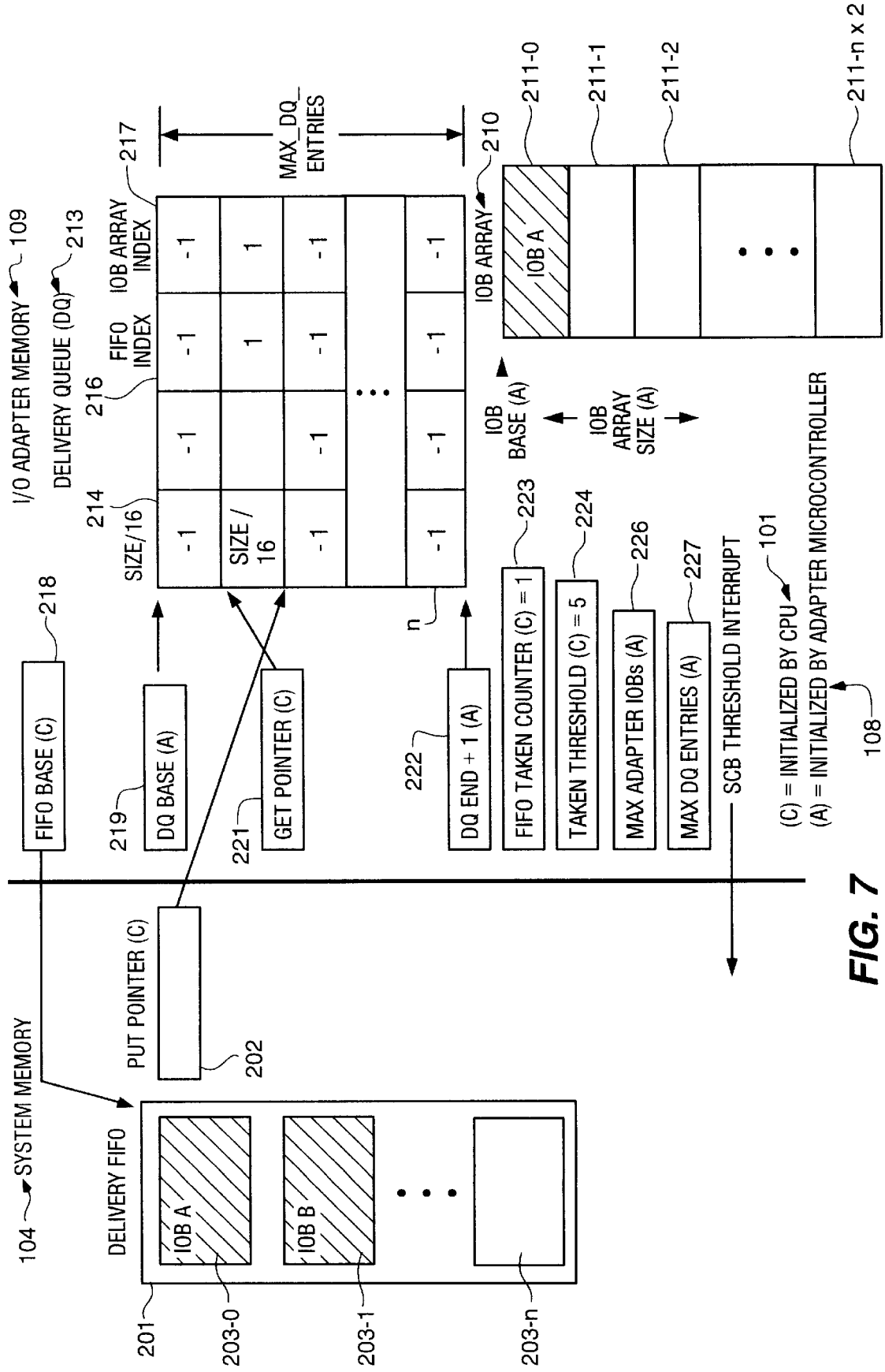

Description of FIG. 7

FIG. 7 represents the system condition in which delivery queue 213 has a valid IOB entry at its location represented by the position of the get pointer 221 which, on FIG. 6, still is pointing the beginning address of the delivery queue. The adapter microcontroller scans the entry of delivery queue 213 referenced by get pointer 221 and copies IOB A from the delivery FIFO into the position 211-0 of IOB array 210. The adapter microcontroller then increments get pointer 221 to the beginning address of the second row of the delivery queue and rewrites the delivery queue entry for the top row back to a −1 indicating an idle condition of the top row portion. The adapter microcontroller also increments the taken counter 223 to a 1 when IOB A is copied to IOB array 210. The adapter microcontroller compares taken counter 223 against taken threshold counter 224. Since the taken counter is less than the threshold counter, no threshold interrupt is generated.

Figure 8:
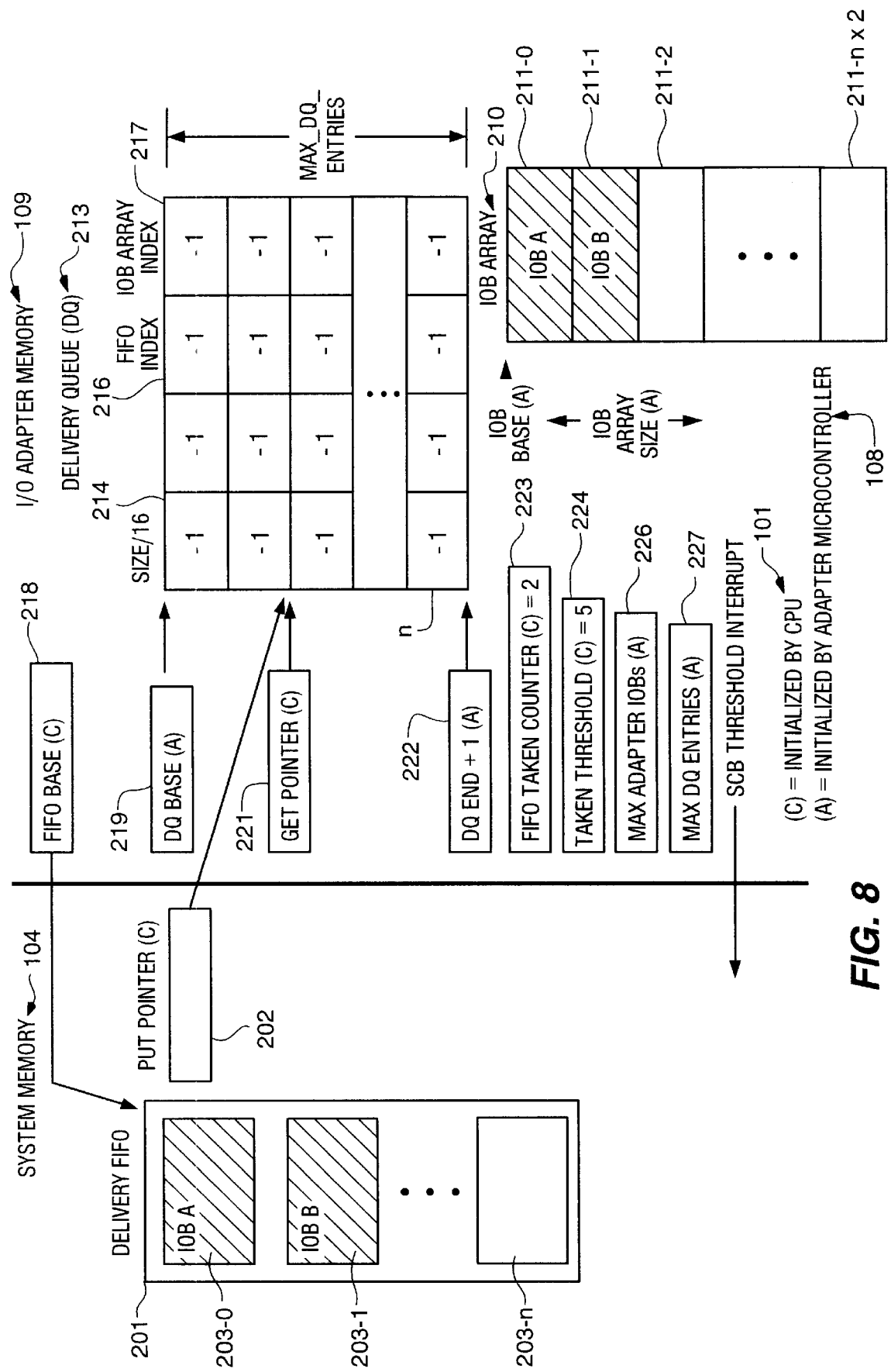

Description of FIG. 8

FIG. 8 portrays the system condition in which the I/O adapter again recognizes a valid entry at the get pointer 221 location of the delivery queue (the second row). The microcontroller adapter now copies IOB B in FIFO 201 into position 211-1 of the IOB array 210. The microcontroller now increments the get pointer 221 to the third row of the delivery queue and also increments the taken counter to a count of 2. The microcontroller also resets the delivery queue entry for the second row to a −1 indicating an idle condition of portion 203-1 of the delivery queue.

Figure 9:
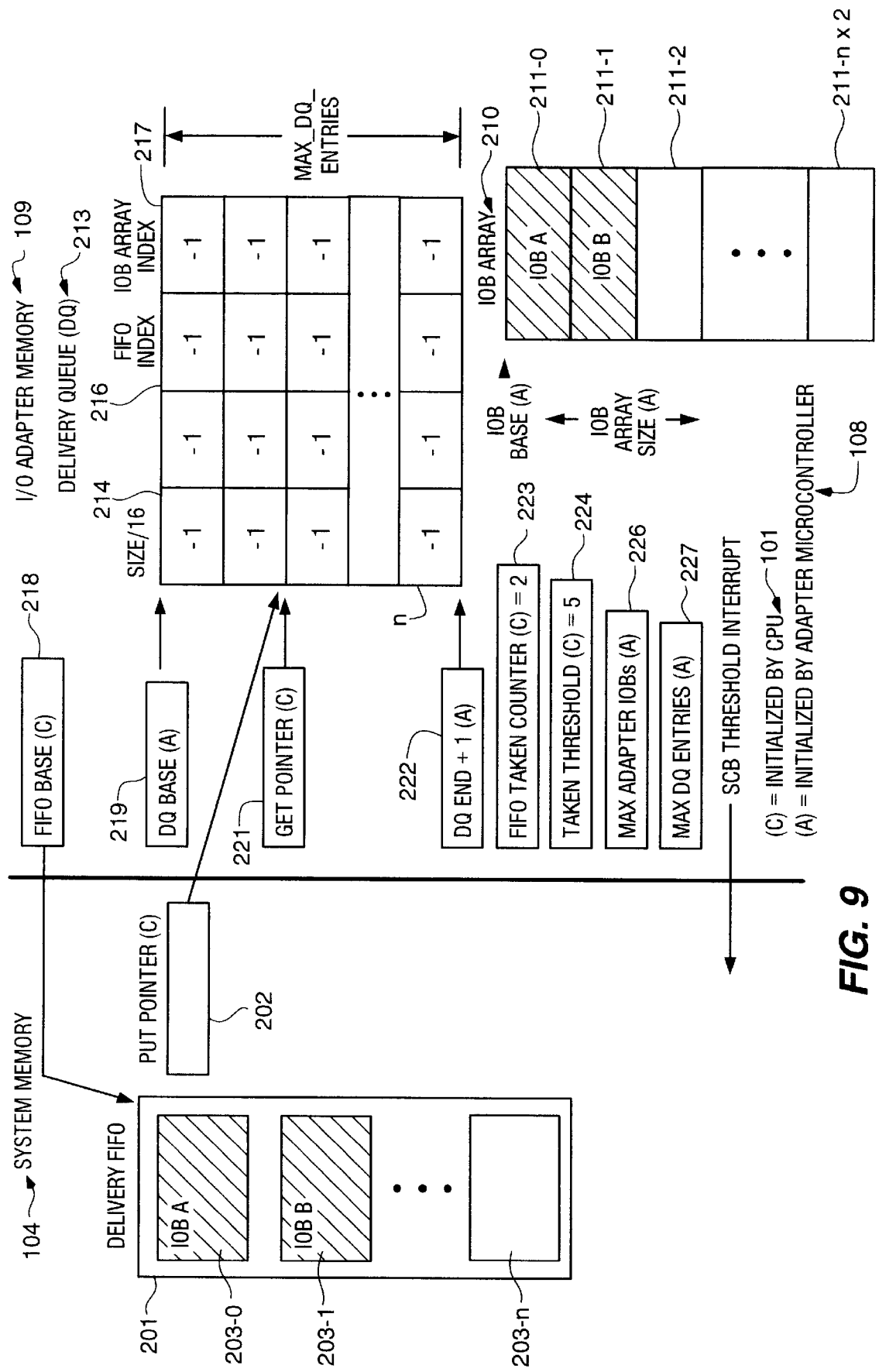

Description of FIG. 9

FIG. 9 illustrates the system condition in which taken counter 223, as shown on FIG. 8, has a count of 2. With reference to FIG. 9, the first two IOB's in FIFO 201, namely IOB A and IOB B have been copied into the I/O array 210 in its locations 211-0 and 211-1. All rows of the delivery queue has been reset to its idle condition in which the entries are a −1.

The taken counter 223 is set to 2 while the taken threshold counter 224 remains at 5. Since the taken counter of 2 is less than the taken threshold of 5, no threshold interrupt is generated at this time. However, if the taken threshold counter had been operated at a lower level, such as 2, the taken counter then would equal the threshold count and a threshold interrupt would have been issued by the adapter to the CPU. This would have caused the CPU to free the first two entries, IOB A and IOB B, in its delivery FIFO so that they would be available to be overwritten by newly generated IOBs.

The threshold interrupt is used in situations, such as system start up, in which a plurality of I/O operations are not ongoing so that no I/O completion interrupt signals are being returned from the peripheral devices to the I/O adapter and, in return, from the I/O adapter to the host. Under such situations, it is possible for FIFO 201 to become full so that it cannot receive newly generated IOBs. In order to prevent this from adversely affecting system operation, the taken threshold count 224 is set to a level so that an interrupt will be generated when taken counter 223 reaches taken threshold counter 224 so as to cause an interrupt that will free up the FIFO locations to receive newly generated IOBs.

Figure 10:
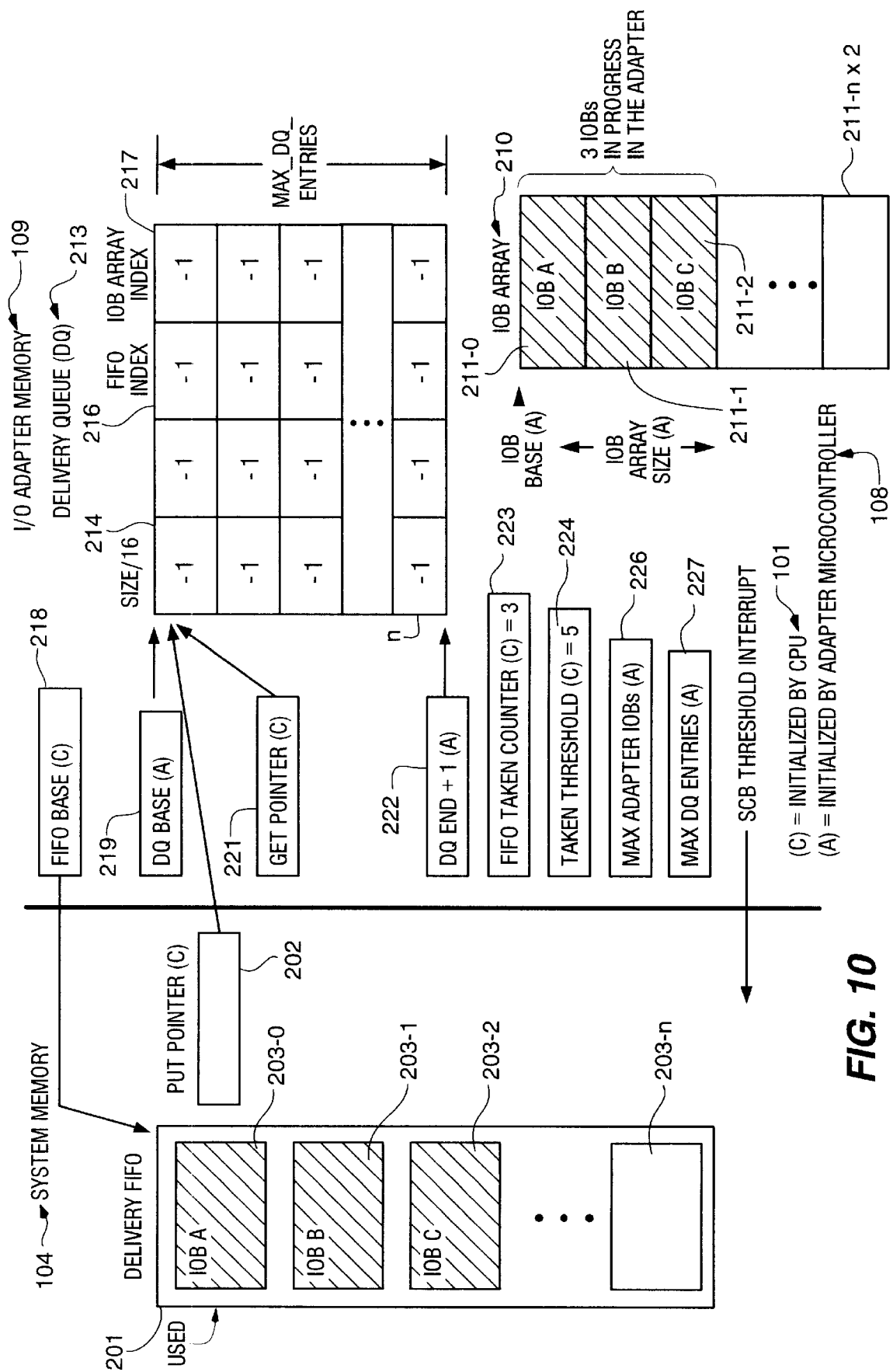

Description of FIG. 10

FIG. 10 represents a system condition in which the CPU generates a third IOB (IOB C) and writes it into location 203-2 of FIFO 201. The first two IOB's (IOB A and IOB B) have been copied to positions 211-0 and 211-1 of IOB array 210. At the beginning of this operation, the put pointer 202 and get pointer 221 are both pointing to the beginning of the third row of the delivery queue as shown in FIG. 9. The CPU of the host computer now enters data for IOB C into the third row of delivery queue 213 as shown on FIG. 10. The adapter detects this IOB C entry in the delivery queue. Get pointer 221 and the put pointer 202 are incremented to the end of the delivery queue. They are then reset to the beginning of the delivery queue by the DQ end +1 register 222. IOB C is then copied to position 211-2 of IOB array 210. Taken counter 224 is incremented to 3 when IOB C is copied to I/O array 210. The IOB array 210 now has three of its locations in use since three IOB's have been copied to it from the delivery FIFO.

Element 226 entitled "max adapter IOB's" indicates the size of IOB array 210. This determines the number of IOB's that can be concurrently served by the IOB array. Element 227 entitled max DQ entries indicates the number of entries that can be stored in delivery queue 216. Element entitled DQ end +1 presumably specifies the end location +1 of the delivery queue in the I/O adapter memory 109 and is used to reset get pointer 221 to the top row of the delivery queue.

Figure 11:
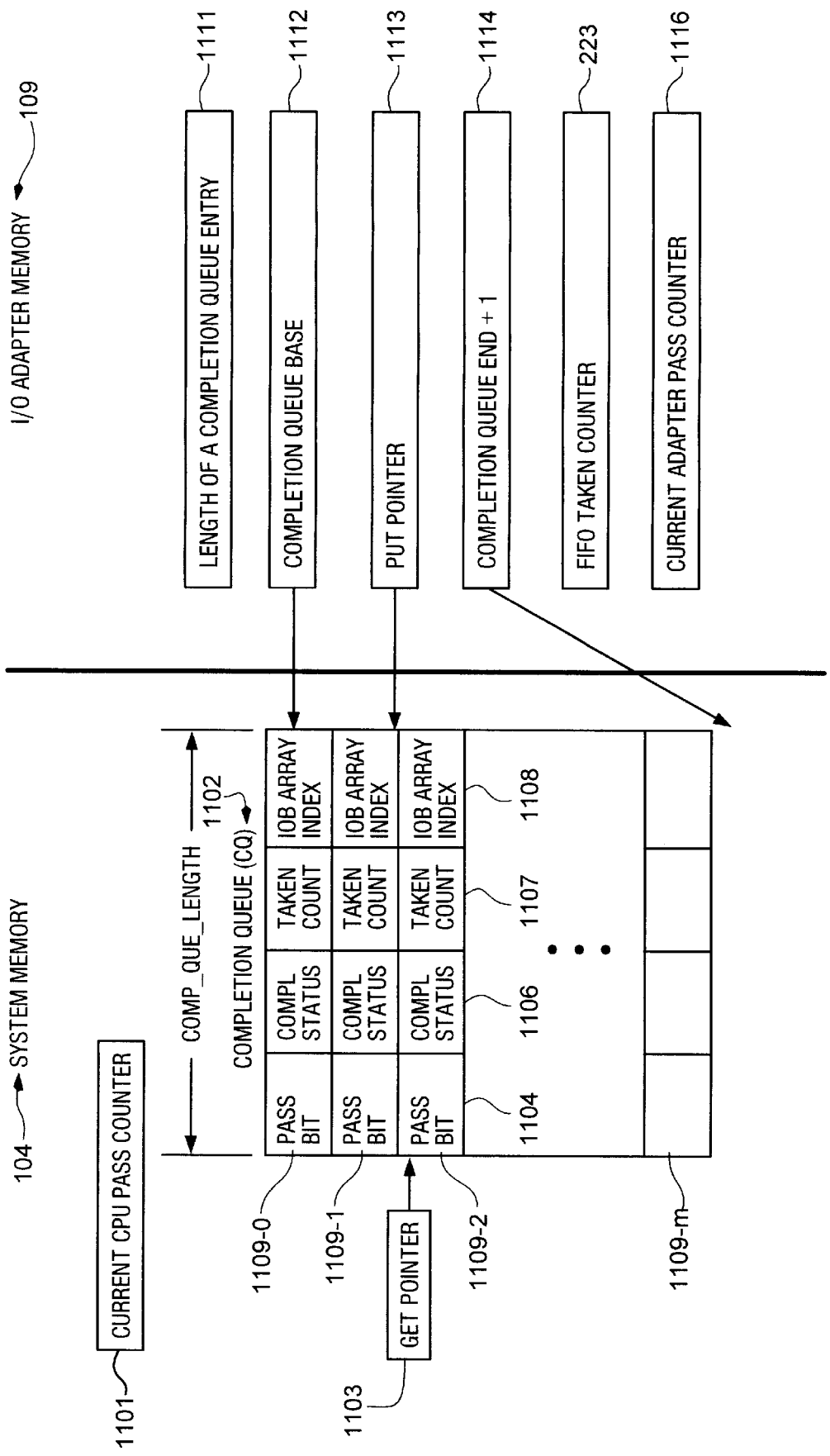
FIG. 11 discloses the elements of the system memory and adapter memory involved in the transmission of information to the host from the I/O adapter when an IOB is complete.

Description of FIG. 11

The CPU must also receive information from the I/O adapter indicating that an IOB in IOB array 210 has been completed. An I/O device returns a completion signal to the I/O adapter which, in turn, returns information on an interrupt basis to the CPU indicating that the I/O operation has been completed. The CPU uses this return information for a number of purposes. As subsequently described, one of these purposes is to free up those FIFO locations which contain IOB's that have been copied to IOB array 210 since the time of the last completion interrupt. Thus, when a return interrupt signal is received by the CPU, all FIFO locations containing IOB's which have been copied to IOB array 210 are invalidated in the FIFO and made available to be overwritten. The FIFO taken counter 223 is instrumental in this operation since the magnitude of its count when I/O completion interrupt signal is received by the CPU determines the number of FIFO IOB's invalidated and made available to be overwritten.

FIG. 11 illustrates the IOB completion mechanism by which information for a completed IOB is transmitted to the host. When an IOB is successfully completed, the I/O adapter is so advised by the appropriate I/O device and the adapter, in turn, returns the IOB array 210 index of the completed IOB back to the host. This is done by the adapter writing the appropriate entry into the IOB array index portion 1108 of completion queue 1102 and then generating a completion interrupt to the CPU. The completion queue contains a plurality of rows, each of which receives information for a different IOB returned to the CPU. Each completion queue entry is entered into a different one of the rows such as 1109-0, 1109-1, 1109-2. Each row of the completion queue contains four different elements representing four items of information returned by the adapter. These four items of information represent a pass bit, a completion status, a taken count, and an IOB array index. The function of the pass bit is subsequently described in detail. The completion status information indicates whether or not the I/O operation represented by the entry for the row was successful or alternatively, whether it represents a failed I/O operation. The function of the taken count information is subsequently described. The IOB array index represents the identity or location of the completed IOB in the IOB array 210 shown on the preceding figures. If the completion status information indicates a successfully completed I/O operation, the host CPU completes the remainder of the I/O operation for the client process without any further reference to the IOB stored in the array 210 on the preceding figures. If this completion status information represents a failed I/O operation which must be retransmitted, the host can directly read the IOB from the IOB array 210 to obtain the additional information that maybe needed.

The pass bit 1104 determines which entries in completion queue 1102 are valid. The host CPU and the I/O adapter microcontroller each maintain a pass counter which is initialized to 1. The host pass counter is element 1101, the pass counter for the I/O adapter is element 1116. The pass count information is stored in the pass bit 1104 of each completion queue entry. The pass bits of each entry are initialized to 0 prior to information for a completed IOB being entered into the row of completion queue 1102. This is done when the I/O adapter writes a new valid entry into completion queue 1102 for a completed IOB. As subsequently described in detail, each time the I/O adapter reaches the end of the completion queue array it flips its local pass counter 1116 value. The host CPU initializes its get pointer 1103 to the beginning of the completion queue 1102 and scans that location for an entry with a pass value equal to the local pass count value of element 1101. The host CPU also removes entries from completion queue 1102 and increments its get pointer 1103 until the pass value in counter 1101 and the pass value for an entry of the completion queue do not match. This indicates that the entry is not a new entry that has been placed in this location by the I/O adapter.

In addition to passing completed IOB interrupt information back to completion queue 1102, a taken count is also returned to completion queue 1102 to indicate the number of IOB's taken by the I/O adapter from FIFO 201 since the last completion interrupt. Since delivery FIFO 201 contains fewer positions than does IOB array 210, the host CPU needs to know when the adapter has copied IOB's from delivery FIFO 201 so that the CPU can reuse these portions of the delivery FIFO. As IOB's are completed by the system, the adapter returns its FIFO taken count 223 to completion queue 1102 and causes a completion interrupt to be generated. At that time, the CPU knows from the taken count portion of the completion queue entry how many IOB's have been taken by the adapter and entered into its I/O array since the last IOB completion interrupt. As priorly described, this information is used by the CPU to free up a number of FIFO positions equal to the taken count information. Thus, when the system is in a steady state with IOB's being completed on a regular basis, the CPU will not have to rely on a threshold counter 224 interrupt to free up locations in FIFO 201.

The following describes the various steps involved in the transfer information for a completed IOB from the adapter to the host.

Figure 12:
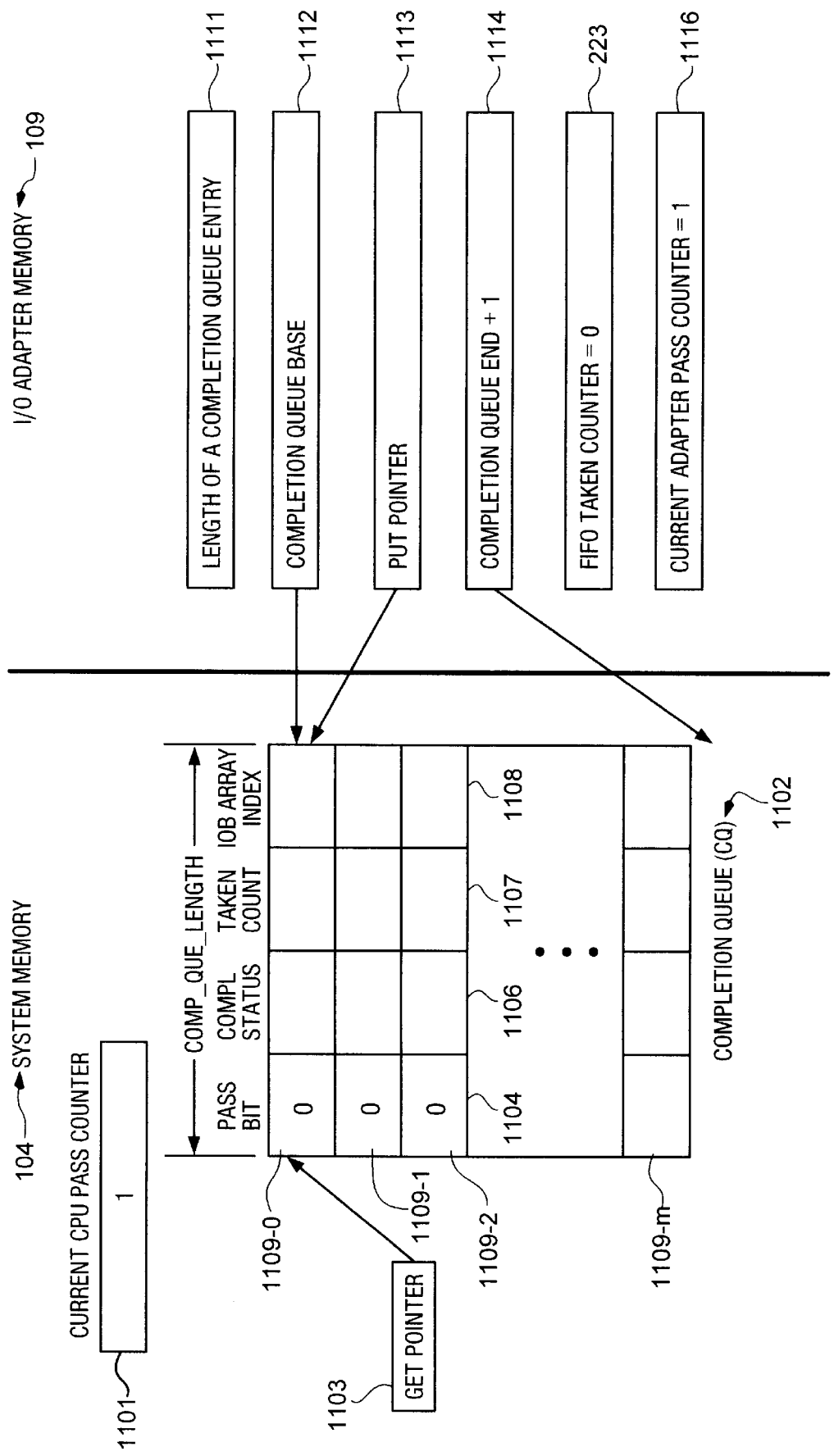
FIGS. 12–17 are similar to FIG. 11 except that they show contents of the system memory and the adapter memory at each step involved in the delivery of completed IOB information back to the host from the I/O adapter.

Description of FIG. 12

FIG. 12 represents the initialized state of the system of FIG. 11. Both the CPU and the adapter have initialized their pass counters to 1. The pass counter for the CPU is element 1101. The pass counter for the adapter is element 1116. The pass bits in each row of the completion queue are set to 0. Get pointer 1103 and put pointer 1113 are initialized to the beginning address of completion queue 1102. FIFO taken counter 1115 is initialized to 0. The initialization time referred to herein is at system startup when no IOB's have been created or served.

The completion status bit 1106 in the completion queue can represent either a success or a failure of an IOB completion. If success is indicated, the host operation proceeds without further reference to the IOB. However, if the completion status bit indicates an error, then the host CPU can directly read the IOB from the adapter I/O array 210. The host can deliver to two IOB's before the I/O adapter 107 must acknowledge the receipt of these IOB's.

Figure 13:
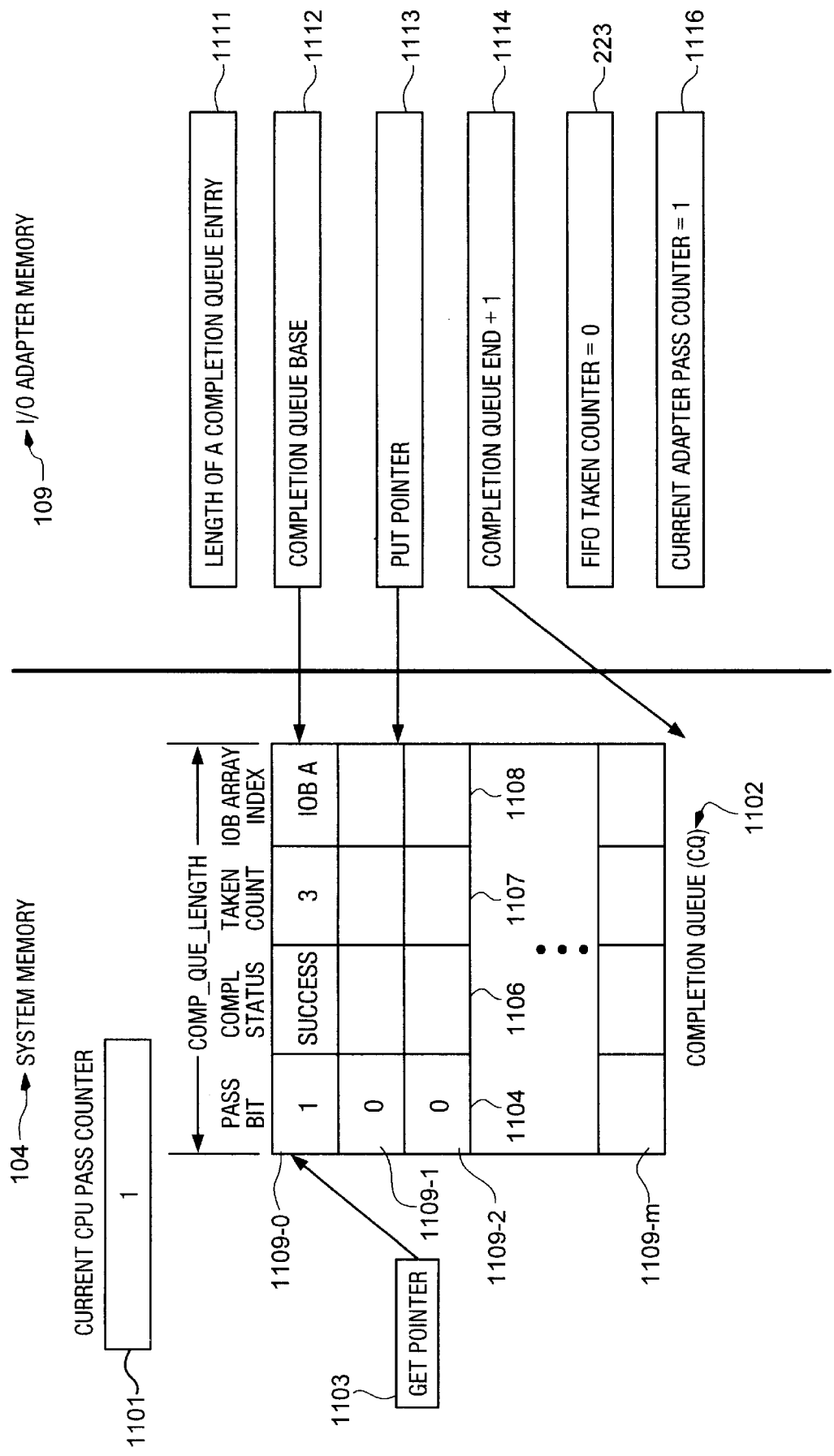

Description of FIG. 13

The system status of FIG. 13 assumes a continuation of the system condition of FIG. 10 in which IOB array 210 contains IOB A, IOB B and IOB C and taken counter 223 is set to 3. On FIG. 13, the adapter serves a first completed IOB (IOB A) by writing the appropriate information in top row 1109-0 of completion queue 1102. This information is written into top row 1109-0 at the address referenced by put pointer 1113 as shown in FIG. 12. This information includes a completion status of "success" and a pass bit of 1. The adapter also writes a taken count of 3 into the completion queue. The taken count but of 3 indicates that three IOB's in FIFO 201 has been copied to IOB array. The adapter then resets FIFO taken counter 1115 to 0 as shown in FIG. 13 and generates an interrupt to the CPU. The IOB array index for this IOB is IOB A and is indicated in the segment 1108 of the top row of completion queue 1102. The operation just described for the first IOB assumes that the first completed IOB is as IOB A. This need not be the case since either IOB B or IOB C, or an earlier IOB, could be the first IOB completed by the system since the time of the last completion interrupt. The IOB array index indicates the address of this completed IOB in IOB array 210 on FIGS. 2 through 10. On FIG. 10, the 0 position of the IOB array 210 currently stores IOB A following the transfer of IOB A from FIFO 201 to the 0 position of IOB array 210.

The host, after the receipt of this information, may invalidate and overwrite IOB A, IOB B and IOB C in delivery FIFO 210 in order to free up the FIFO for the serving of another IOB. The adapter also increments the put pointer 113 which advances to the position shown on FIG. 13 so as to point to the second row 1109-1 of the completion queue. This position of put pointer 1113 causes I/O information for the next completed IOB to be written into this second row 1109-1 of completion queue 1102. Taken counter 223 is reset to 0.

Figure 14:
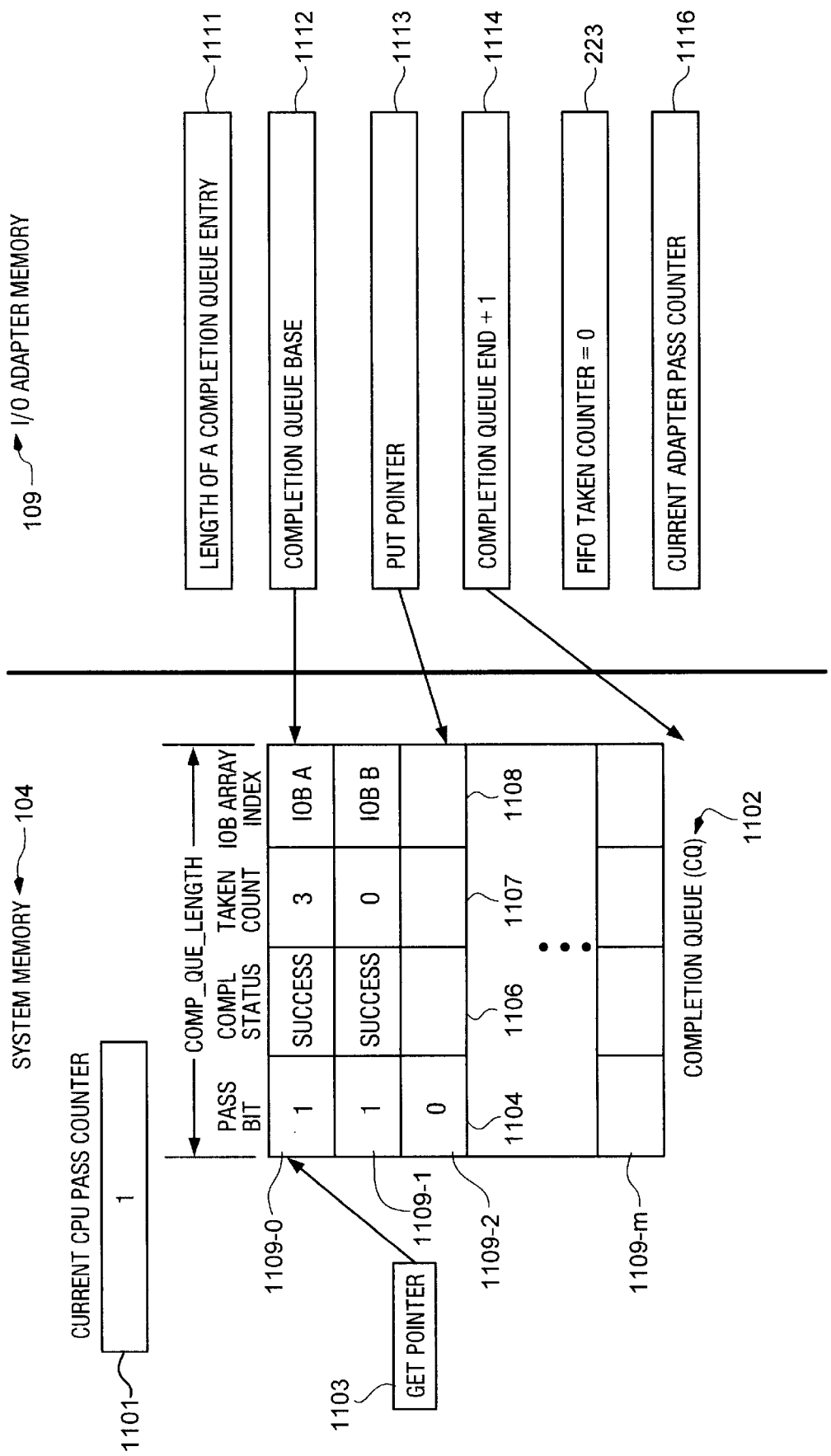

Description of FIG. 14

FIG. 14 portrays the system condition in which the adapter has completed the processing of the second IOB (IOB B) currently stored in the IOB array 210. This operation is accomplished before the CPU can respond to the interrupt just described for FIG. 13. The information for IOB B is written into the second row 1109-1 of completion queue 1102 and includes a taken count of 0. The taken count of 0 indicates that the adapter has not taken any additional IOB's from the delivery FIFO since the time of the last interrupt (for IOB A) transmitted by the adapter to the host. The information for this second completed IOB includes a status of "success" and a pass bit of 1. The CPU pass counter bit remains at 1 for reasons subsequently described. The current adapter pass counter 1116 remains set at 1 for reasons subsequently described. The put pointer 1113 is incremented to point to row 1109-2 of the completion queue since the next received completed IOB information will be stored in the bottom row.

Figure 15:
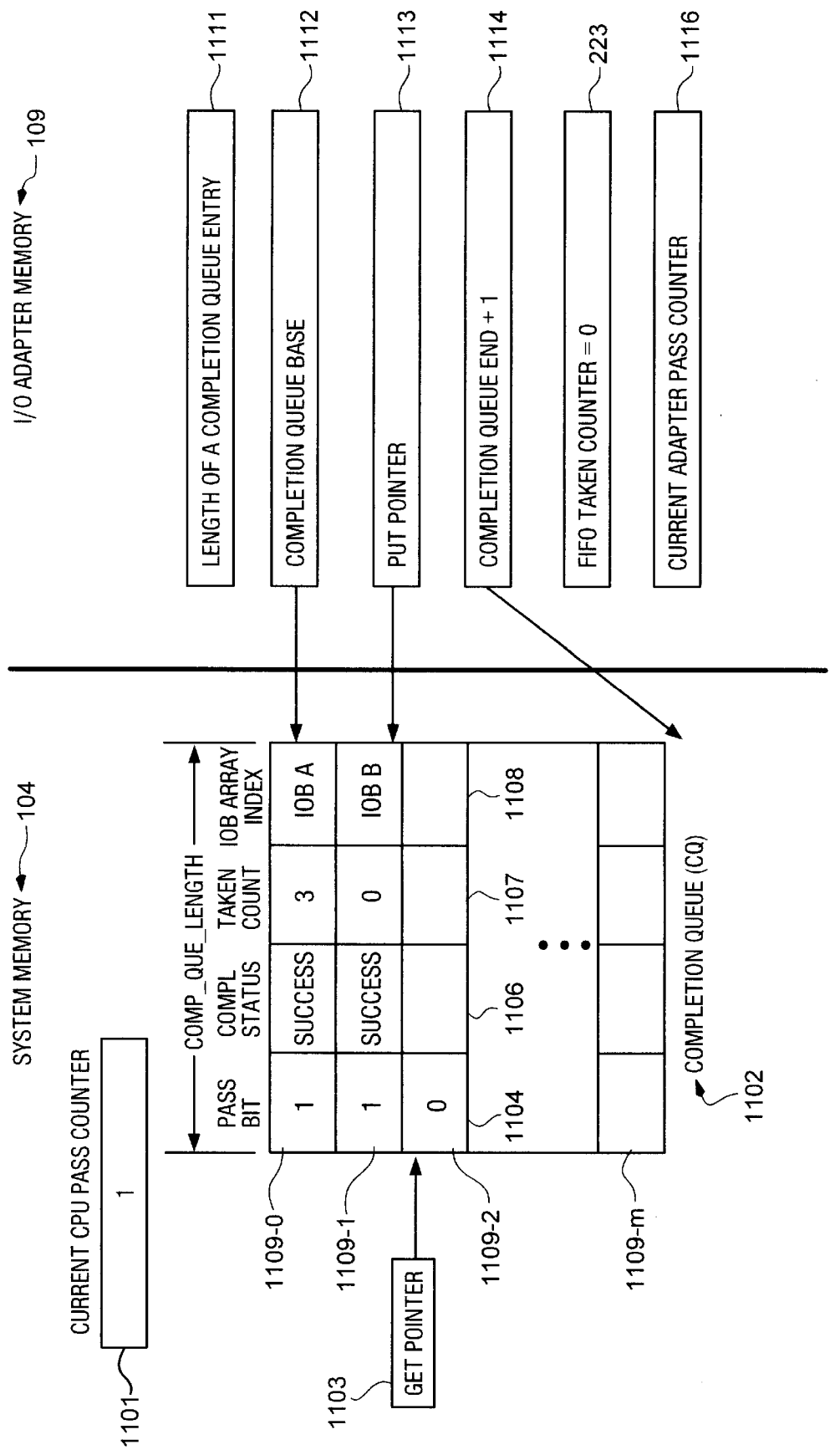

Description of FIG. 15

FIG. 15 portrays the system condition in which the CPU has responded to the interrupt previously described that was generated by the adapter and transmitted to the CPU. The CPU now reads the completion queue entry referenced by its get pointer 1103 which at this time is pointing at the address of the top row 1109-0 of completion queue 1102. The CPU reads each completion queue entry with a pass bit of 1. This includes the entries in the first and second rows of the completion queue. The CPU reads these entries and completes the I/O operation for each entry. Thus, the CPU now retrieves the first two IOB's, namely IOB A and IOB B, from the first and second rows of the completion queue. The CPU then increments its get pointer 1103 to the bottom row after retrieving IOB A and IOB B. When the IOB A entry is retrieved with a taken count of 3, the CPU frees this IOB A, IOB B and IOB C in delivery FIFO 201 of FIG. 10.

Figure 16:
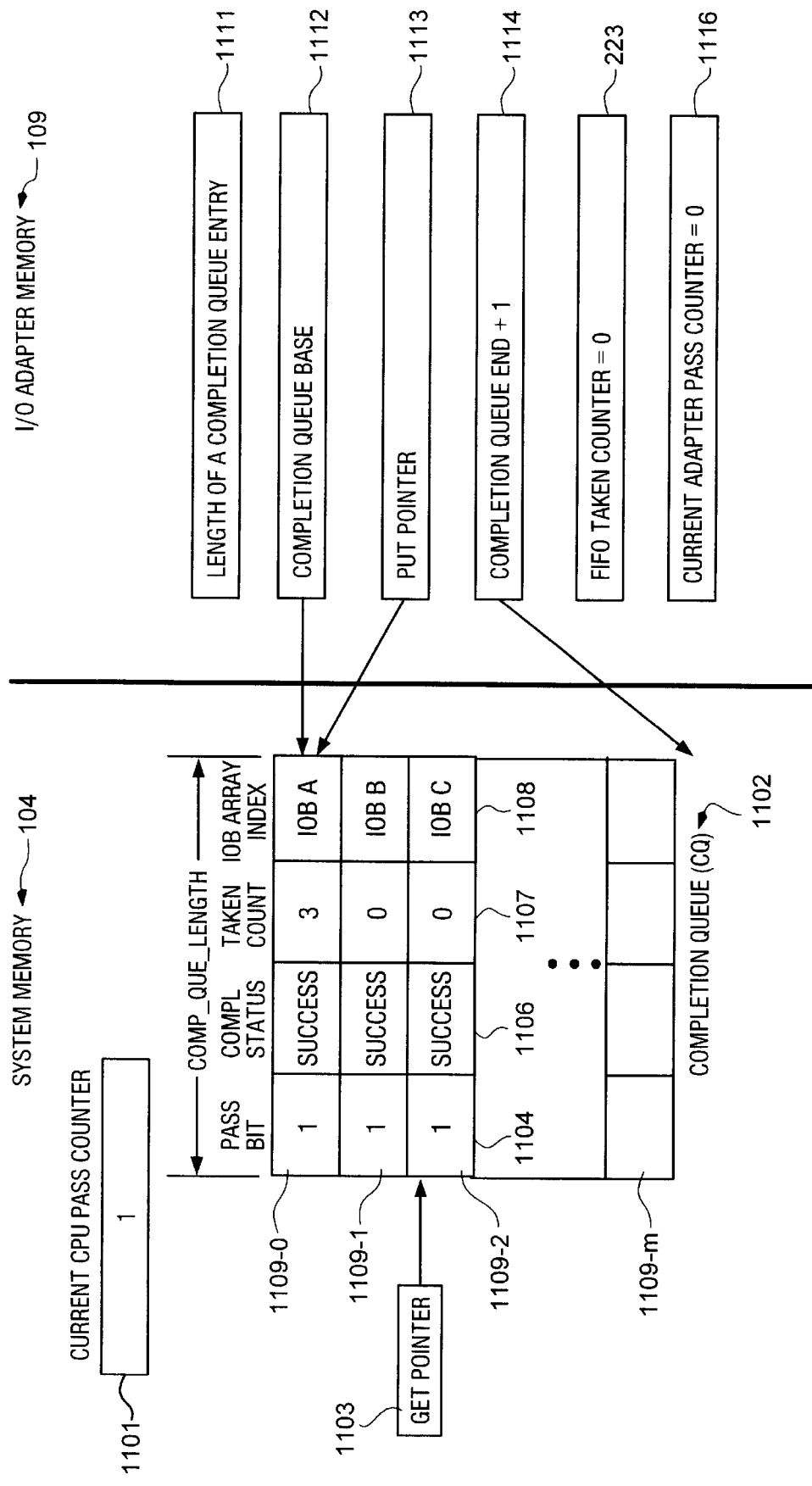

Description of FIG. 16

As shown in FIG. 16, the I/O adapter completes a third IOB (IOB C) and writes an entry therefore into the third row of the completion queue. The adapter increments its put pointer 1113 to the next row of the completion queue. The operation continues in this manner for other IOB's. When the put pointer is incremented beyond the end of the completion queue, the put pointer is reset back to the beginning of the completion queue by the completion queue end +1 element 1114. Since the adapter has wrapped back to the beginning of the completion queue, it toggles its pass counter 1116 back to 0 as shown on FIG. 16 from the value of 1 that was stored by it in the preceding Figures.

Figure 17:
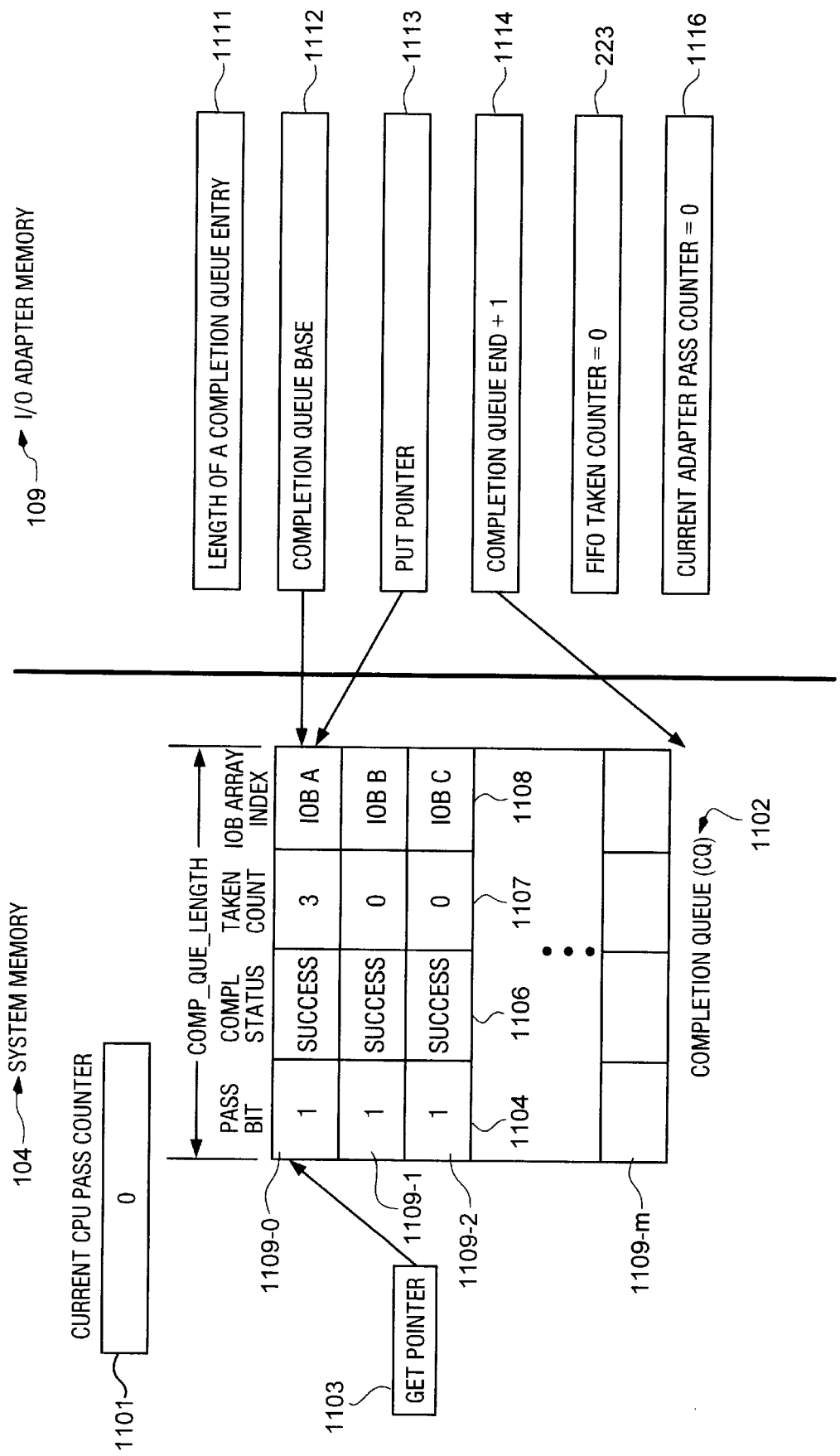

Description of FIG. 17

FIG. 17 indicates the system condition in which the CPU now retrieves IOB C in the third row of the completion queue. The host CPU retrieves this information under the control of get pointer 1103 which on FIG. 16 is pointed at the third row of the completion queue. When the host retrieves the information for IOB C, it increments get pointer 1103. When the get pointer points to the bottom row of the completion queue it returns back to the first row of the completion queue. The incrementing of the get pointer 1103 from the last to the first row of the completion queue causes the value in the current CPU pass counter 1101 to switch from a 1 to a 0. At this time, the pass bit of 1 in the top row of the completion queue as referenced by the get pointer 1103 does not match the value of 0 in the CPU pass counter 1101. This indicates to the host that no more valid entries are to be retrieved from the completion queue at this time. The reason for this is that the operation of the adapter and the completion queue is such that a valid entry in the completion queue must have a pass bit of the same value as the bit in current pass counter 1101. Since the 0 in the pass counter 1101 does not equal the value of the pass bit of 1 shown in any of the rows of the completion queue of FIG. 17, this indicates to the CPU that none of the entries now in the completion queue are valid entries and need not be processed at this time.

The length of each completion queue entry is stored in element 1111 as the information for the entry is transmitted by the adapter to the completion queue element 1112 represents the base address of the completion queue in the system memory. Put pointer 1113 specifies the completion queue address into which information will be written by the adapter for the next received IOB. Completion queue end +1 1114 causes put pointer 1113 to cycle from the third row of the completion queue back to the first row after a third row entry is read. FIFO taken counter 223 indicates the number of IOB's taken from the delivery FIFO 201 since the time of the last interrupt transmitted by the adapter to the host. Element 1116 shows a value of the pass count in the adapter. The value of the pass counter 1116 flips from a 0 to a 1 and vice versa as put pointer 1113 of the adapter cycles from the third row of the completion queue back to the first row.

It is to be expressly understood that the claimed invention is not to be limited to the description of the preferred embodiment but encompasses other modifications and alterations within the scope and spirit of the inventive concept.

We claim:

1. A method of operating a system comprising a computer having a CPU and a FIFO memory connected via a bus to an I/O adapter for the transmission of IOBs between said computer and said adapter; said method comprising the steps of:

entering IOBs generated by said CPU into said FIFO memory having space for storing n IOBs concurrently;

writing data pertaining to each IOB in said FIFO into a delivery queue in said adapter;

copying an IOB from said FIFO to an IOB array in said adapter in response to said writing of data pertaining to said IOB in said delivery queue;

said IOB array having space for storing more than n IOBs concurrently;

detecting the completion by said system of any IOB in said I/O array;

writing data for said any completed IOB from said adapter into a completion queue in said computer; and in response to said writing, invalidating each completed IOB in said FIFO that has been transferred to said IOB array.

2. The method of claim 1 in which said steps of invalidating comprises the step of invalidating x IOBs in said FIFO in response to the entry of data for any completed IOB into said completion queue.

3. The method of claim 1 in which said step of writing data into a completion queue comprises the steps of:

writing a taken count into said completion queue indicating that x IOBs in said FIFO have been copied into said IOB array since the last time data for any completed IOB was written into said completion queue; and invalidating x IOBs in said FIFO in response to the reception of said taken count.

4. The method of claim 1 further including the steps of:

signaling said CPU that an IOB has been completed subsequent to said copying of x IOBs in said FIFO to said IOB array; and invalidating said x IOBs in said FIFO.

5. The method of claim 1 in which said step of invalidating comprises the steps of:

invalidating IOBs in said FIFO subsequent to the copying of said IOBs into said IOB array; and wherein said IOB's remain in said adapter subsequent their invalidation in said FIFO.

6. The method of claim 1 in which said step of writing data for said completed IOB comprises the step of writing data into said completion queue including completion status information indicating whether said IOB was successfully completed.

7. The method of claim 1 in which said step of concurrently storing requires storage for a lesser number of IOBs in said FIFO than in said IOB array of said adapter.

8. The method of claim 1 further including the step of serving an IOB using only a single system interrupt.

9. The method of claim 1 including the step of serving IOBs of different size by writing data for an IOB into said delivery queue with said data including information specifying the size of said IOB to be transferred to said IOB array.

10. The method of claim 1 in which said step of writing information into said delivery queue for each IOB includes the step of writing an IOB array index identifying the location of said IOB array that is to receive said IOB from said FIFO.

11. The method of claim 1 in which said step of writing information into said completion queue entry for each IOB includes the step of writing an index identifying the location of said IOB in said IOB array.

12. The method of claim 1 in which the step of writing information into each completion queue for an IOB includes the step of writing a taken count indicating the number of IOBs written into said IOB array by said FIFO subsequent to the last completion of an IOB by said system.

13. The method of claim 1 in which the step of writing information into said completion queue for each IOB includes the step of writing completion status information indicating whether each said IOB was successfully completed by said system.

14. The method of claim 1 in which the step of writing information into each completion queue entry includes the step of writing a pass bit for controlling the entry of IOB information into said completion queue.

15. The method of claim 1 in which the step of writing information into each completion queue entry includes the step of writing an index of an IOB in said IOB array, a taken count, a completion status information and a pass bit.

16. The method of claim 1 in which the step of writing said data into said delivery queue includes the step of writing information indicating the size of an IOB to be copied from said IOB to said IOB array.

17. The method of claim 16 further including the step of writing an index identifying the location of said IOB in said FIFO.

18. The method of claim 16 further including the step of writing an index identifying the location in said IOB array into which said IOB is to be copied from said FIFO.

19. The method of claim 1 in which said step of writing said data into said delivery queue includes the step of writing IOB size information, a FIFO index, and an index of said IOB in said IOB array.

20. A method of operating a system comprising a computer having a CPU and a FIFO memory connected to an I/O adapter for the transmission of IOBs between said computer and said adapter; said method comprising the steps of:

entering IOBs generated by said CPU into a said FIFO memory having space for storing n IOBs concurrently;

copying each IOB in said FIFO to an IOB array in said adapter said IOB array having space for storing more than n IOBs concurrently;

said adapter being responsive to the copying of any IOB into said IOB array for transmitting each said IOB to an IO device of said system;

determining that any IOB in said IOB array has been completed by said system; and in response to said determination invalidating each completed IOB in said FIFO that has been copied to said IOB array.

21. A system comprising a computer having a CPU and a FIFO memory connected via a bus to an I/O adapter for the transmission of IOBs between said computer and said adapter; said system comprising:

means for writing IOBs generated by said CPU into a said FIFO memory having space for storing n IOBs concurrently;

means for writing data pertaining to each IOB in said FIFO into a delivery queue in said adapter;

means for scanning said delivery queue for the presence of data pertaining to an IOB;

means for copying an IOB from said FIFO to an IOB array in response to the scanning of data in said delivery queue pertaining to said IOB;

said IOB array having space for storing more than n IOBs concurrently;

said adapter being responsive to the presence of an IOB in said IOB array for transmitting each said IOB to an IO device of said system;

means for detecting the completion by said system of any IOB in said IOB array;

means for transmitting data for said any completed IOB from said IOB array to a completion queue in said computer; and means responsive to said transmitting for invalidating each completed IOB in said FIFO that had been copied to said IOB array.

* * * * *